(12) United States Patent
Spoor

(10) Patent No.: US 7,011,010 B2
(45) Date of Patent: Mar. 14, 2006

(54) FREE PISTON DEVICE WITH TIME VARYING CLEARANCE SEAL

(75) Inventor: Philip S. Spoor, Waterford, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/802,923

(22) Filed: Mar. 18, 2004

(65) Prior Publication Data

US 2005/0204913 A1    Sep. 22, 2005

(51) Int. Cl.
*F01B 29/00* (2006.01)
(52) U.S. Cl. .......................................... 92/6 R; 92/240
(58) Field of Classification Search ............... 92/6, 92/240, 245, 169.1, 6 R
See application file for complete search history.

(56) References Cited

U.S. PATENT DOCUMENTS

| | | | | |
|---|---|---|---|---|
| 1,762,602 A | * | 6/1930 | Wideman | 92/206 |
| 1,776,147 A | * | 9/1930 | Clagett | 92/169.1 |
| 2,895,773 A | * | 7/1959 | McConnaughey | 92/245 |
| 2,907,304 A | * | 10/1959 | Macks | 91/6 |
| 4,911,618 A | | 3/1990 | Suganami et al. | 417/439 |
| 6,901,755 B1 | * | 6/2005 | Corey et al. | 60/520 |

* cited by examiner

*Primary Examiner*—Edward K. Look
*Assistant Examiner*—Igor Kershteyn
(74) *Attorney, Agent, or Firm*—Stanley Ktorides

(57) ABSTRACT

A free piston device which is particularly applicable for use with a linear motor for providing acoustic energy to a cryocooler for generating refrigeration at cryogenic temperatures which comprises a time varying clearance seal to counteract piston drift.

7 Claims, 3 Drawing Sheets

FREE PISTON DEVICE WITH TIME VARYING CLEARANCE SEAL

TECHNICAL FIELD

This invention relates generally to free piston devices and is particularly useful for a piston employed with a linear motor for providing acoustic energy to a cryocooler.

BACKGROUND ART

Free piston devices use reciprocating pistons or displacers, but eschew crankshafts or other mechanical linkages to enforce motion, relying instead on the overall system dynamics as communicated by oscillating gas pressure to guarantee the proper motion amplitude and phase of different system components. As such, there is no natural constraint on piston mean position, which may drift off-center even if the dynamics are properly executed. This can result in shortening the useful stroke of the piston, or damage to the piston or other components if contact occurs.

In a reciprocating free piston device with clearance seals, the pistons will tend to drift toward the side with the greater oscillating pressure. This is understood to be due to the higher density of the gas flowing through the seal during the half-cycle where the high-oscillating pressure side is high, versus the reverse flow in the other half of the cycle. This results in a buildup of gas on one side of the piston, and a corresponding difference in mean pressure, which exerts a force on the piston thus causing it to move off-center.

Conventional corrective measures have fallen into three categories: (1) centerports, which are leak paths across the piston built into the piston seal so that they are open only when the pressure difference across the piston is supposed to be a minimum, and thus any built-up mean-pressure difference will tend to equalize twice in each cycle; (2) compensating flow networks which include networks with one-way valves connecting the two sides of the piston, or connected to reservoirs at different pressures, that are designed to leak fluid in a direction opposite to the unbalanced flow through the piston seal; and (3) perturbative DC currents where a DC current applies a corrective DC force to a free piston that is current-actuated (such as a linear motor) to oppose the pressure caused by fluid buildup on one side. The first two schemes involve a bypass path around the piston seal. The bypass path inevitably increases manufacturing costs, and introduces reliability and quality control problems. Many such schemes require some degree of active control and/or adjustment to work properly; centerports and check valves may become fouled with debris, and check valves may fail altogether. The bypass path also increases the dissipation in the system. A perturbative DC current requires additional sensors and control electronics, and is impractical on all but the smallest free piston devices.

Accordingly it is an object of this invention to provide an improved free piston device to better counteract piston drift.

SUMMARY OF THE INVENTION

The above and other objects, which will become apparent to those skilled in the art upon a reading of this disclosure, are attained by the present invention, which is:

A free piston device with a piston having a frequency of reciprocation over a stroke length and with first and second sides facing first and second variable volumes, respectively, for containing a working fluid, where the first and second volumes communicate via a clearance seal between the piston and a housing in which it reciprocates, the improvement comprising means for varying the geometry of the clearance seal in a manner coordinated with the cycle of piston reciprocation to produce time-varying seal geometry, such time-varying said geometry reducing or eliminating the time-averaged flow of working fluid which would otherwise occur, thereby reducing or eliminating drift of the piston from its nominal center along the axis of reciprocation.

BRIEF DESCRIPTION OF THE DRAWINGS

The numerals in the Drawings are the same for the same or similar elements.

DETAILED DESCRIPTION

The present invention recognizes that a piston seal that varies properly in time throughout a cycle of piston motion can harness the gas flow dynamics to control the piston position without an additional flow path or corrective DC signal. The free piston of this invention is self-centering, with no active control, no adjustments, no extra leak path around the seal, no extra manufacturing costs, no failure modes, and lower dissipation. The invention employs a piston and a seal that have zero net flux across them. This time-varying seal geometry serves to control the flow through the seal. The invention encompasses the recognition that leakage can be controlled and balanced, and the mean position controlled, by designing the piston and/or the seal so that the seal geometry varies during each cycle in such a way as to suppress or reverse the natural net leakage flux. Controlling piston position passively while eliminating the need for centerports, bypass tubes, or check-valve networks results in lower cost, higher efficiency, fewer failure modes, and lower parts count. The invention makes use of the discovery that hollow pistons can flex in response to a pressure difference across the piston shell, so that in the presence of oscillating pressure the shell expands during one half cycle, thus narrowing the seal gap, and contracts during the other half cycle, thus increasing the seal gap. In most devices with hollow pistons, this results in increased unbalanced mass flux through the seal and increased piston drift. This invention embodies the recognition that a piston can be devised that reverses the usual pressure gradient on the piston shell, causing the seal gap to tighten when the pressure is high in front (the "front" being the side with higher dynamic pressure) and vice versa. This essentially makes the piston seal itself behave like a check-valve, reducing flow in the direction that normally causes piston drift/offset.

Figure 1:
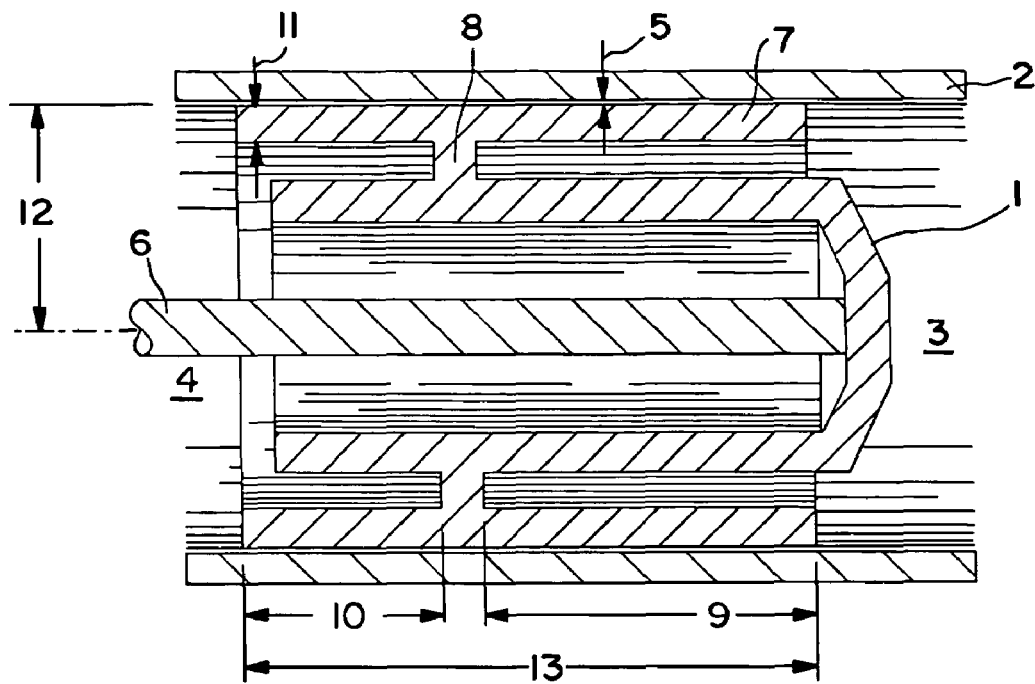
FIG. 1 is a cross sectional representation of one preferred embodiment of the free piston device of this invention.

The invention will be described in greater detail with reference to the Drawings. Referring now to FIG. 1, piston (1), which may be cast as one piece, or made of several machined parts, is reciprocating in a cylinder (2), separating the working fluid into two volumes (3) and (4) that communicate through an annular clearance gap (5). If the piston is part of an actuator such as a linear motor, it may be connected by means of a piston rod (6). The outer shell (7) of the piston is divided by webbing (8) into sections (9) and (10), which are chosen by design, using quantities such as the clearance gap (5), the piston radius (12), the working fluid properties, the amplitudes and phases of the dynamic pressures in volumes (3) and (4), the thickness (11) of the outer shell, and the total length of the seal (13).

Figure 2:
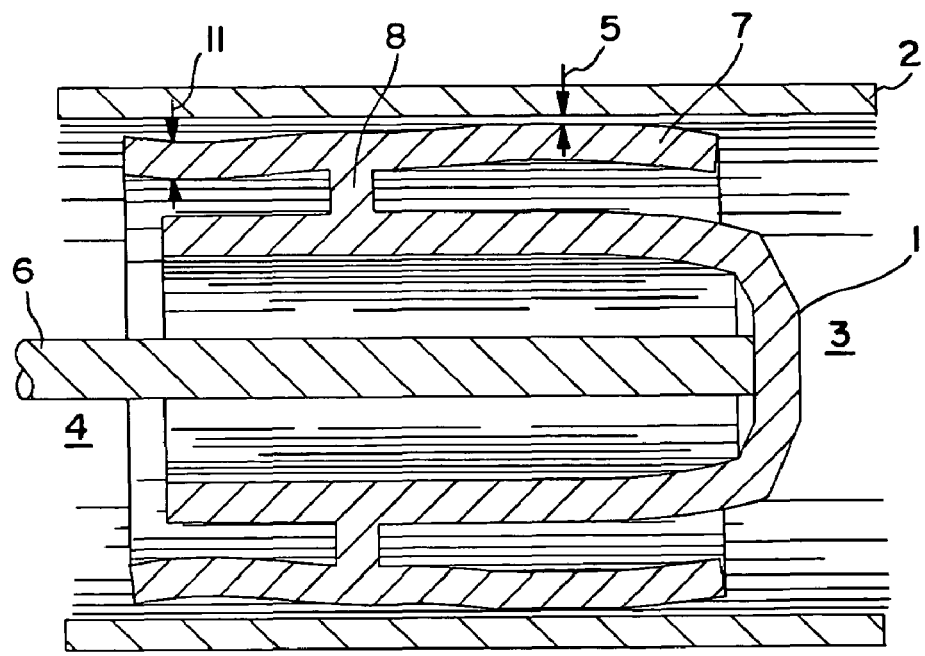
FIG. 2 is a cross sectional representation of the embodiment of the invention illustrated in FIG. 1 as it might appear when the instantaneous pressure at one end of the piston exceeds the instantaneous pressure at the other end of the piston.

Section (9) of the piston shell will experience radial expansion when the pressure in volume (3) is high and the pressure in volume (4) is low, whereas section (10) will experience radial contraction. The free ends of these sections will experience no deflection, and the ends that connect to the webbing (8) will have nearly zero slope, so that the resulting (exaggerated) shape of the piston might resemble that shown in FIG. 2. That is, the seal gap in section (9) will be reduced and that in section (10) will be increased when the instantaneous total pressure in (3) exceeds that in (4). If (9) is longer than (10), the seal gap will experience net decrease, thus discouraging flow through the seal. When the pressure in (4) exceeds the pressure in (3), the seal gap will experience a net increase, thus encouraging flow. Note that the deflection of the piston inner shell (1) must also be considered. If the dynamic pressure amplitude in (3) is greater than in (4), this is the desired seal behavior to oppose the natural time-averaged second order mass flux that would occur. The strength of the opposing flux can be controlled by the relative lengths of sections (9) and (10). If the piston radius (12) is especially large and the piston shell (11) is especially thin, the piston-deflection driven flux will dominate over the second-order time-averaged flux, so sections (9) and (10) would be nearly equal.

This embodiment of the invention has many advantages, chief among them that the "check-valving" of the flow in the seal created by the flexing piston shell can easily be made strong enough to overcome the natural time-averaged mass flux that would occur in the absence of a flexing piston. The actual flexing of the piston shells in real machines is so minute that there is no concern of fatigue, so this represents a truly maintenance-free solution with no additional parts or flow paths.

Figure 3:
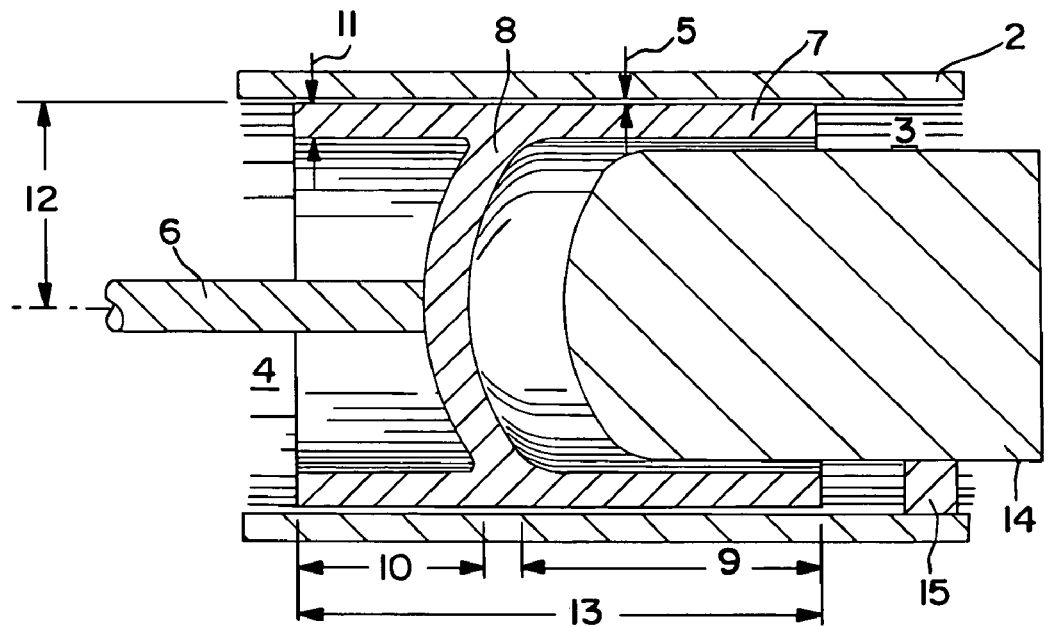
FIG. 3 is a cross sectional representation of another preferred embodiment of the free piston device of this invention wherein the piston has a stationary solid volume.

FIG. 3 shows a piston similar to that shown in FIG. 1, but the inner shell (1) of the piston has been replaced by a solid volume (14) which is affixed by some means (15) to be stationary with respect to the cylinder. The piston in this case may be less massive than in the embodiment illustrated in FIG. 1, but the volume of working fluid in (3) need not increase.

Figure 4:
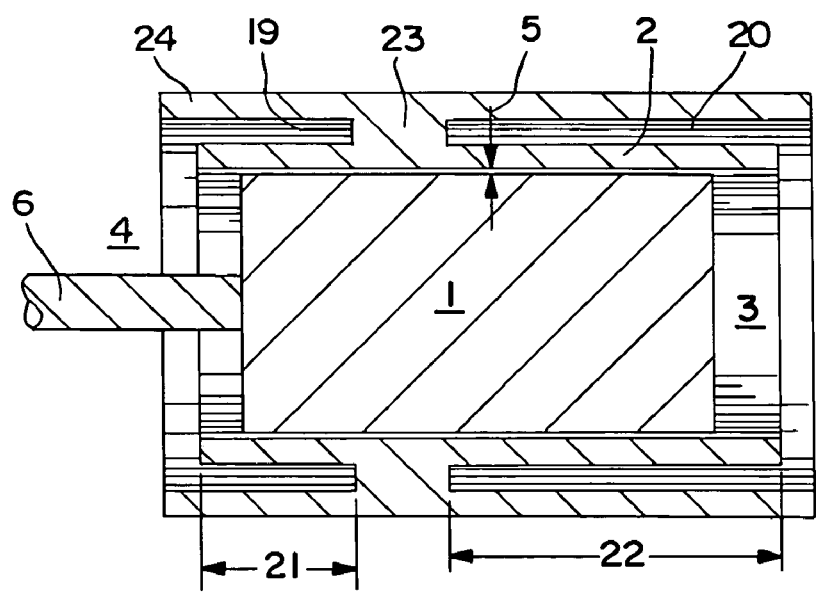
FIG. 4 is a cross sectional representation of another preferred embodiment of the free piston device of this invention wherein the seal flexes in response to oscillating pressures.

The present invention would also include configurations where the piston seal flexes, rather than (or in addition to) the piston, as shown in FIG. 4.

Here the piston (1) is shown solid, and hence unflexing, for clarity (although it need not be), and the cylinder is constructed so that it comprises an inner shell (2), bounded on its inside diameter by the clearance seal gap (5), and on its outside diameter by one or more annular volumes, shown here as (19) and (20). A webbing (23) or other means connects the cylinder shell (2) to an outer shell (24) or other rigid support, and separates the two annular volumes (19) and (20). The two sections (21) and (22) are chosen to minimize piston drift. In the example shown in FIG. 4, if we assume the oscillating pressure amplitude in volume (3) exceeds that in volume (4), we would expect that (22) would be made longer than (21), so that the inner shell (2) of the piston cylinder experiences a net radial compression when the total pressure in (3) exceeds that in (4), hence reducing the seal gap and discouraging flow from (3) to (4).

Figure 5:
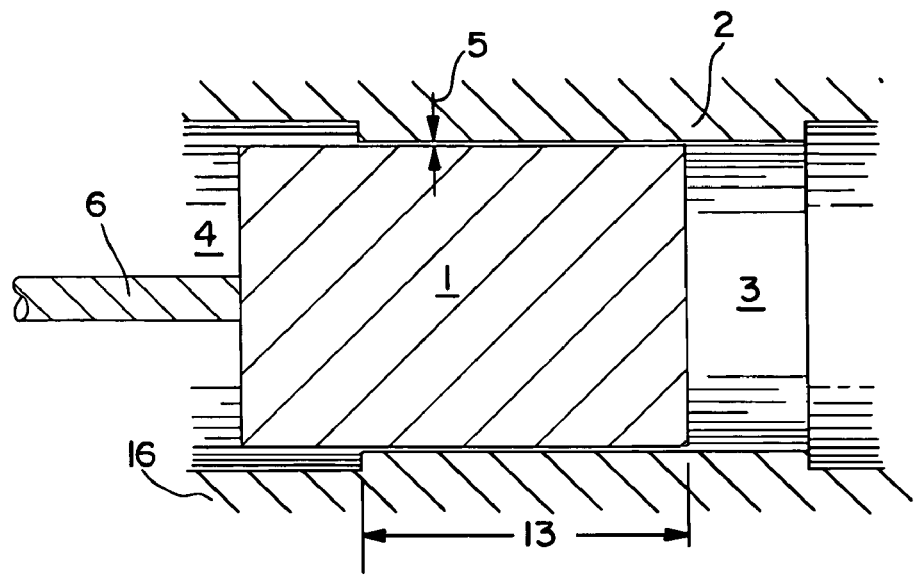
FIG. 5 is a cross sectional representation of another preferred embodiment of the free piston device of this invention wherein the length of the seal varies with the motion of the piston.

The present invention also covers other means of time-varying the piston geometry, besides flexing pistons or seals. One example is shown in FIG. 5. If the amount of unbalanced mass flux in the seal is small, it may be sufficient to construct a stepped cylinder, where the smaller-diameter region (2) serves as the piston bore with a small clearance gap (5), and the outer region (16) is connected to a rigid support or forms part of a housing or pressure vessel. The piston is disposed so that at its equilibrium position, it is not centered in the bore, but protrudes out of one side. The effective sealing length of the bore (13) therefore modulates with time as the piston moves. Since mass flux through the seal is inversely proportional to its length, flow through the seal may be encouraged or discouraged at appropriate points in the cycle depending on how the piston and cylinder are configured.

In the example shown in FIG. 5 we assume that the dynamic pressure amplitude in (3) exceeds that in (4) and that therefore the piston is naturally inclined to drift towards (3) during operation. If the phase between piston motion and dynamic pressure in (3) is such that the pressure in (3) is near a maximum when the piston is at its furthest excursion into (3), then the seal length will be near a maximum when the pressure difference driving flow from (3) to (4) is a maximum. Thus this flow is discouraged, and the reverse flow is encouraged, which opposes the natural tendency of gas to accumulate in the volume with lower dynamic pressure. The equilibrium position of the piston in the cylinder may be adjusted to reflect whatever phasing exists between oscillating pressure and piston motion, so that the seal length is made to be a maximum when the pressure difference across the seal is a maximum.

This invention also covers the use of some other aspects of free piston behavior, normally considered pathological, to eliminate piston drift if that behavior creates a time-varying seal geometry that is important to its function. An example is the following. It is usually the intent during the manufacture of a piston bore that the piston bore be of uniform diameter. However, if one creates a bore that has a taper from one end to the other, this can create a time-varying effective seal gap as the piston reciprocates in the tapered bore. This can diminish piston drift depending on the degree of taper and its orientation.

Figure 6:
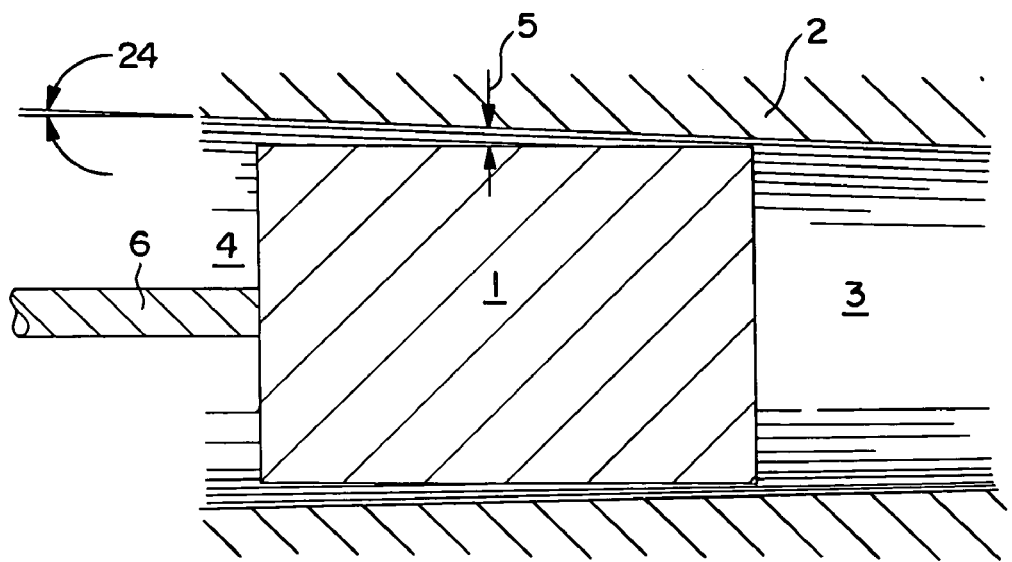
FIG. 6 is a cross sectional representation of another preferred embodiment of the free piston device of this invention having a tapered piston and cylinder.

FIG. 6 shows a possible implementation of this embodiment. The taper angle (24) is chosen with consideration of the average seal gap (5), the piston diameter, seal length, and working fluid properties, to minimize piston drift. In the example shown, the taper (exaggerated) is such that the seal gap decreases the farther the piston moves into volume (3). If the dynamic pressure amplitude in (3) exceeds that in (4), and the pressure is in phase or close to in phase with the piston motion, then this piston bore taper will discourage the natural accumulation of working fluid in (4) by reducing the seal gap when the total pressure in (3) exceeds that in (4), and vice versa when the total pressure in (4) exceeds that in (3).

Although the invention has been described in detail with reference to certain preferred embodiments, those skilled in the art will recognize that there are other embodiments of the invention within the spirit and the scope of the claims.

The invention claimed is:

1. A free piston device with a piston having a frequency of reciprocation over a stroke length and with first and second sides facing first and second variable volumes, respectively, for containing a working fluid, where the first and second volumes communicate via a clearance seal between the piston and a housing in which it reciprocates, the improvement comprising means for varying the geometry of the clearance seal in a manner coordinated with the cycle of piston reciprocation to produce time-varying seal geometry, such time-varying seal geometry reducing or eliminating the time-averaged flow of working fluid which would otherwise occur, thereby reducing or eliminating drift of the piston from its nominal center along the axis of reciprocation.

2. The free piston device of claim 1, where the time-varying seal geometry is produced by means comprising a piston with an outer shell which can grow or shrink radially in response to pressure forces.

3. The free piston device of claim 1, where the time-varying seal geometry is produced by means comprising a piston cylinder having an inner diameter which is bounded by fluid in the clearance seal, and at least part of the piston outer diameter is bounded by working fluid undergoing pressure oscillations, so that the cylinder diameter and the clearance seal gap grow or shrink in response to oscillating pressure forces.

4. The free piston device of claim 1, where the time-varying seal geometry is produced by means comprising a piston having a sealing surface which at least in part extends out of the seal during part of the reciprocation cycle.

5. The free piston device of claim 1, where the time-varying seal geometry is produced by means comprising a tapered piston bore, so that the effective seal gap is dependent on piston position in the bore.

6. A free piston device with a piston having a frequency of reciprocation over a stroke length and with first and second sides facing first and second variable volumes, respectively, for containing a working fluid, where the first and second volumes communicate via a clearance seal between the piston and a housing in which it reciprocates, the improvement comprising means for varying the geometry of the clearance seal in a manner coordinated with the cycle of piston reciprocation to produce time-varying seal geometry, where the time-varying seal geometry is produced by means comprising a piston with an outer shell having two sections, one section experiencing radial expansion and the other section experiencing radial contraction in response to pressure in the first and second variable volumes.

7. The free piston device of claim 6 wherein one of the two sections is longer than the other section.

* * * * *